Feb. 16, 1954   F. D. HOWE   2,669,255
GAS VALVE
Filed March 19, 1947
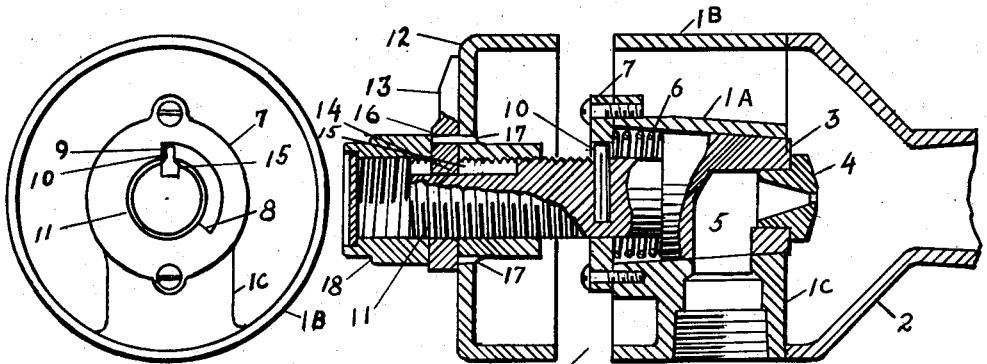
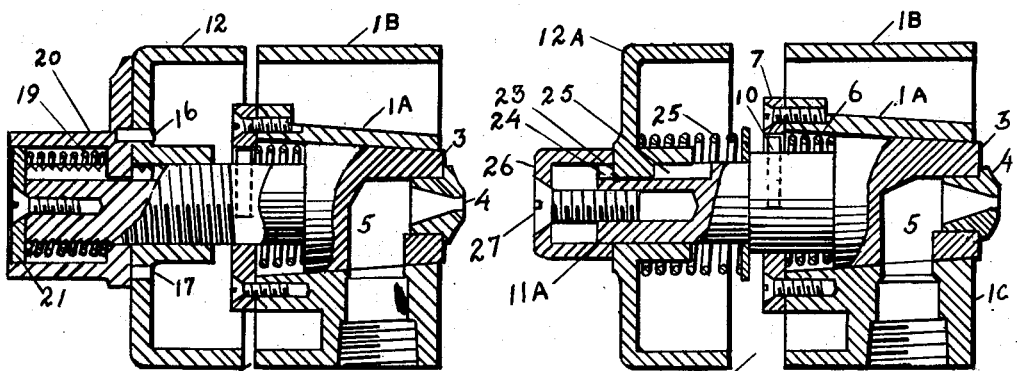
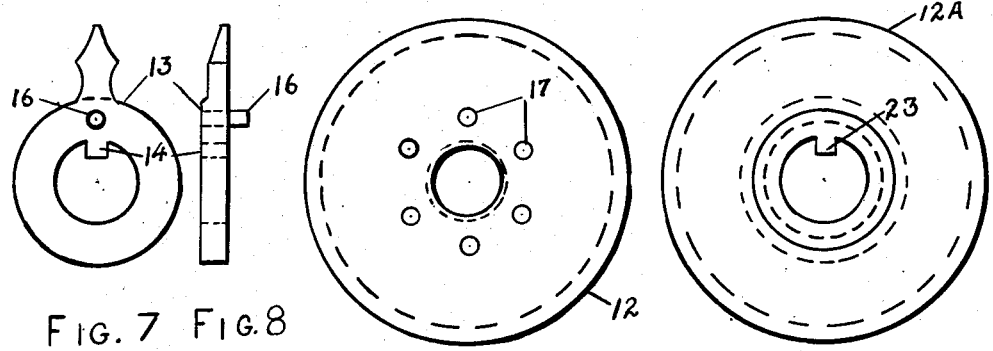
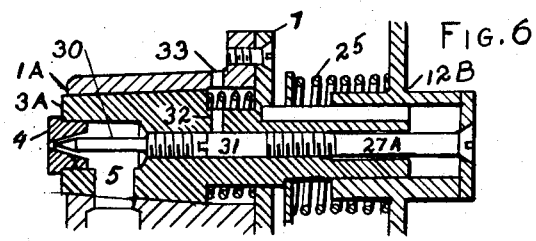
INVENTOR
Frank D. Howe

UNITED STATES PATENT OFFICE 2,669,255

GAS VALVE

Frank D. Howe, Cuyahoga Falls, Ohio

Application March 19, 1947, Serial No. 735,643

8 Claims. (Cl. 137—607)

This invention provides a valve for gas burners combining means for controlling the gas with novel means for regulating the primary air for combustion, adjustment for the gas orifice, and means for making unobjectionable any leakage of gas past the gas adjuster.

It also presents an attractive appearance especially adapting it to use in domestic heaters.

In the drawings, Fig. 1 is an assembly in section on line A—A of Fig. 2 with the valve connected to the usual venturi.

Fig. 2 is an end view of Fig. 1 with handwheel, pointer and nut removed.

Fig. 3 is a sectional assembly showing a modified method of adjusting and locking the parts.

Fig. 4 is a sectional assembly showing a simplified means for adjusting the primary air.

Fig. 5 is a face view of the handwheel used in Fig. 4.

Fig. 6 is a face view of the handwheel used in Figs. 1 and 3.

Fig. 7 is a face view of the keyed washer and pointer of Fig. 1.

Fig. 8 is a side view of Fig. 7 showing the locking pin.

Fig. 9 is a sectional view, reversed, showing an adjustment for the gas orifice and means for disposal of any gas leaking past the threaded part of the adjuster.

In Fig. 1, the valve housing comprises the valve barrel 1A and the jacket 1B. The valve barrel is supported and centered within the jacket by a neck 1C which is drilled and tapped for gas supply. The valve housing is attached to the venturi, or mixing tube, in any convenient way, as by screws, so that the air passage between the valve barrel and jacket forms a continuation of the venturi air passage.

A plug valve 3 having an orifice plug 4 and port 5 is fitted to a tapered seat in valve barrel 1A and is held to its seat by spring 6 in the usual way. Pin 10 engages shoulders in spring retainer 7 to limit rotation of the valve plug.

Handwheel 12 is a disc having a flanged rim and a threaded part of valve stem 11. Pointer 13 has a sliding fit on the threads of the valve stem and has a key 14 engaging a keyway 15 in valve stem 11. It also carries a pin 16 adapted to engage selectively a plurality of holes 17 in handwheel 12. A nut 18 locks the parts.

In Fig. 3, nut 18 is replaced by spring 19 in housing 20 which housing also has the functions of pointer 13 of Figs. 1 and 7. Washer 21 acts as an abutment for spring 19 and as a guide for housing 20.

In Figs. 1, 3 and 4, 22 is an air gap for entering primary air, adjustable by longitudinal movement of the handwheel upon the valve stem.

In Fig. 4, handwheel 12A slides longitudinally on valve stem 11A and has a key 23 which engages keyway 24 to rotate the valve; or the keyway may be in the handwheel and the key in the stem.

The thrust of spring 25 is met by screw 27 acting through cap 26.

In Fig. 9, the internally threaded valve 3A contains a threaded and needle pointed adjuster 30 by which the effective area of the gas orifice may be adjusted. A chamber 31 is provided back of adjuster 30 and this chamber is connected by open passages 32 and 33 with the primary air passage surrounding the valve barrel. Any gas passing the threaded part of adjuster 30 is vented into the primary air stream eliminating the usual packing gland which would be difficult to provide in this construction.

Operation

In the form shown in Fig. 4, the hand wheel 12A can be pushed against the valve housing 1B, closing the primary air inlet before rotating the hand wheel to close the valve. This prevents the usual inrush of primary air which dilutes the mixture in the burner and often causes objectionable noise of extinction. It is obvious that a catch may be provided (not shown) to hold the handwheel against the valve housing when the valve is closed to insure that the primary air is shut off until the flame is burned out.

Primary air is adjusted by longitudinal movement of the handwheel upon the valve stem. The valve is operated by rotational movement of the handwheel in the usual way.

In Figs. 1 and 3, adjustment of primary air is made by disconnecting the keyed member from the handwheel which is then screwed backward or forward upon the valve stem to get the desired adjustment. Pin 16 is then entered into one of the holes 17 when the handwheel can be used to rotate the valve. The adjustment is locked by nut 18 in Fig. 1 or by spring 19 in Fig. 3.

In Fig. 4, the operation of adjusting the primary air inlet 22 is obviously accomplished by turning screw 27 and the adjustment is locked at any point.

The orifice adjustment shown in Fig. 9 is commonly used, the novel feature being the method of disposing of any gas leakage past the threads of adjuster 30. Ordinarily a packing device is used to eliminate leakage but such a device would be difficult to provide in this construction. By providing a free channel for the gas into the stream of primary air the gas cannot escape into the room but is carried into the burner.

The device permits close adjustment of the primary air and, in the preferred forms of Figs. 1, 4 and 9, is fairly safe against unauthorized tampering. A decided advantage in domestic heating is the neat appearance as the only parts which need show outside the heater casing are the handwheel and adjusting parts.

Other embodiments of my invention than those shown may be used within the scope of the appended claims.

I claim as new:

1. A valve barrel, a jacket spaced apart from said barrel, and limiting and defining an air passage about said barrel a plug valve rotatable within said barrel, said valve having a stem, an annular opening to said air passage between said handwheel rim and said jacket, adjustable by axial motions of said handwheel upon said valve stem, and means for locking said handwheel to said valve stem.

2. A valve plug having a stem, a keyway in said stem, a handwheel longitudinally movable upon said stem and having a key engaging said keyway, a spring engaging said handwheel and said valve stem, and forcing said handwheel longitudinally upon said stem, and a threaded member coacting with said valve stem, forcing said handwheel longitudinally upon said valve stem to compress said spring.

3. A valve plug having an externally threaded stem, a handwheel in threaded engagement therewith, a keyway in said valve stem, a separate locking member having a key engaging said keyway, means for detachably locking said member to said handwheel, and resilient means forcing said member against said handwheel and permitting disengagement of said member from said handwheel.

4. A gas valve barrel, a valve plug therein having a stem, an air passage surrounding said valve barrel, a handwheel mounted on said stem in sliding, keyed relation therein, and adapted to open and close said valve by rotational movements and to open said air passage by longitudinal motion away from said air passage and to close it by longitudinal motions towards it; said rotational and longitudinal motions being capable of independent execution, and means for locking said handwheel in a position closing said air passage when said valve is closed.

5. A gas valve having a valve barrel, a jacket surrounding and spaced apart from said barrel, to form an air passage, a valve plug, having a stem, in said barrel, a keyseat in said stem, a handwheel slidably mounted on said stem and having a key slidably engaging said keyway, said handwheel forming with said jacket an inlet to said air passage, a spring forcing said handwheel axially in a direction to enlarge said inlet, and a threaded member coacting with said valve stem, to force said handwheel toward said jacket to close said air passage inlet.

6. A gas valve having a valve barrel, a jacket spaced apart from said barrel and forming therewith an air passage between said barrel and said jacket, a valve plug within said valve barrel having a threaded and keyseated stem, a handwheel in threaded engagement with said valve stem and forming with said jacket an inlet to said air passage, a locking member having a key adapted to slide in said keyway, and means for effecting driving connection between said locking member and said handwheel.

7. A valve barrel, a jacket surrounding said barrel and spaced apart therefrom to form an air passage, a valve plug in said barrel, a gas passage in said valve, an orifice for said gas passage, a threaded hole axially disposed through said valve plug to said gas passage, an orifice adjuster in threaded engagement with said hole, a screw closing the outer end of said hole, a chamber in said hole between said screw and said orifice adjuster, and an open passage from said chamber to said air passage.

8. A valve barrel, a jacket surrounding said barrel and spaced apart therefrom to form an air passage, a venturi, or mixing tube, connected to said jacket to form a continuation of said air passage, a valve plug in said valve barrel, a stem for said valve plug, a handwheel mounted on said valve stem, and an inlet to said air passage between said handwheel and said jacket, said handwheel being movable longitudinally on said valve stem toward said jacket to reduce the inlet opening, and from said jacket to enlarge the inlet opening, and means effecting driving connection between said handwheel and said valve stem to rotate said valve.

FRANK D. HOWE.

References Cited in the file of this patent

UNITED STATES PATENTS

| Number | Name | Date |
|---|---|---|
| 543,692 | Keyes | July 30, 1895 |
| 927,348 | Glass | July 6, 1909 |
| 1,044,118 | Anderson | Nov. 12, 1912 |
| 1,683,128 | Diescher | Sept. 4, 1928 |
| 1,704,851 | Zolleis | Mar. 12, 1929 |
| 2,271,075 | Hulshizer | Aug. 16, 1940 |
| 2,361,694 | Langdon | Oct. 31, 1944 |